United States Patent [19]

Melnyk

[11] 4,025,036

[45] May 24, 1977

[54] PROCESS FOR FABRICATION OF HIGH IMPACT STRENGTH COMPOSITES

[75] Inventor: Paul Melnyk, Parma, Ohio

[73] Assignee: TRW Inc., Cleveland, Ohio

[22] Filed: May 12, 1976

[21] Appl. No.: 685,812

[52] U.S. Cl. .............................. 228/193; 228/206; 228/211

[51] Int. Cl.² .......................................... B23K 19/00

[58] Field of Search ................... 228/206, 211, 193

[56] References Cited

UNITED STATES PATENTS 3,937,387  2/1976  Fletcher et al. ................... 228/193

OTHER PUBLICATIONS

N. M. Voropai et al., "Pre-welding Chemical Treatment of the Surfaces of Aluminum and its Alloys", Autom. Weld. (GB), vol. 24, No. 12, (Dec. 1971), S 2753 0015.

Primary Examiner—James L. Jones, Jr.
Assistant Examiner—K. J. Ramsey

[57] ABSTRACT

An improved method for treating surfaces of aluminum sheets, and in particular, boron reinforced aluminum sheets, to render such sheets more amenable to diffusion bonding which consists in contacting the sheets prior to such diffusion bonding with an aqueous solution containing chloride ions to thereby cause etch pitting on the surfaces.

10 Claims, No Drawings

PROCESS FOR FABRICATION OF HIGH IMPACT STRENGTH COMPOSITES

BACKGROUND OF THE INVENTION

1. Field of the Invention

The present invention is in the field of pretreating aluminum or aluminum alloy surfaces prior to diffusion bonding by means of a chemical etchant.

2. DESCRIPTION OF THE PRIOR ART

It is well known that high strength and high modulus materials can be formed from boron fiber reinforced aluminum sheets, which make them attractive materials for aerospace applications. Much of the technology and material application have been directed toward structural applications. In view of the impressive specific properties of these composites, however, they have also been used for fan and compressor blade applications in turbojet engines. The fabrication of such composites into turbine hardware has been extensively developed and the following U.S. Pat. Nos. are merely cited by way of background:

Gray et al., 3,600103; Athey et al. 3,711,936; Kreider 3,606,667; Stone 3,731,360; Alexander 3,649,425; Alver et al. 3,749,518; Kreider 3,699,623; Carlson et al. 3,762,835; Stone 3,701,190; Whitaker 3,942,231.

A boron-aluminum composite consists essentially of continuous boron fibers arranged in a uniform array to provide optimum reinforcement in an aluminum matrix. Fabrication methods for composites of this type may include;

1. solid state processes,
2. liquid metal processes, and
3. deposition processes.

The present invention is directed to composites which are fomred by means of solid state, hot diffusion bonding. In this type of process, boron filaments are wound into filament mats which are subsequently disposed between aluminum foils and consolidated under heat and pressure in either an environment of air or under vacuum. During consolidation, a metallic bond is formed between the maxtrix foils by solid state diffusion.

One problem which has hindered the successful flight testing and subsequent application of composite blades of this type in gas turbine engines has been their inadequate impact resistance, resulting in reduced resistance to foreign object damage. A composite material used in boron-aluminum fan blades which has failed the foreign object damage test was charcterized by notched Charpy impact values of less than 10 foot-pounds as compared with a typical 15 to 20 foot-pounds impact value for conventional blade material consisting of titanium-aluminum-vanadium alloys.

The Charpy impact energy in boron-aluminum composites is strongly influenced by the matrix composition and fabrication procedures which affect the strength level of the fiber-matrix bond. To achieve a maximum impact resistance in boron-aluminum, it has been found necessary to have a strong bond at the matrix-matrix interface ad a moderate-to-weak bond at the fiber-matrix interface. To achieve the latter, low temperature and short bonding times have been used. However, at such low temperature-time combinations, it is difficult to achieve a sufficiently strong matrix to matrix bond.

SUMMARY OF THE INVENTION

The present invention seeks to improve the bond at the aluminum matrix interface at low bonding temperatures by removing the oxide film which forms a diffusion barrier, thereby maximizing tensile and shear strengths, and maximizing impact resistance. It has now been found that an intimate metal-to-metal contact and low temperature bonding capability can be achieved by chemically etch-pitting the surfaces to be joined by diffusion bonding. Such chemical etch-pitting produces a surface topography which promotes a localized plastic deformation at the matrix-matrix interface with significant improvement in bond strength at low bonding temperatures. To achieve such surface topography prior to bonding, the fully consolidated composite layers are treated with a chemical etchant such as hydrochloric acid or the source of chloride ions such as ferric choloride in aqueous solution. The time of immersion and treatment vary depending upon the concentration and temperature.

During acid treatment, the surface condition of the metal is changed as a result of preferential acid attack. The uniform roughening of the metal surface produces a significant increase in the total surface area which promotes local shear deformation at the fiber-matrix interface but in particular at the matrix-matrix interface during pressing and consolidation of the composite layers. Such deformation, in turn, controls the interfacial bond strength.

The chemical etch-pitting treatment is preferably preceded by an acid wash to remove oxides, and is preferably followed by a desmutting treatment with nitric acid.

DESCRIPTION OF THE PREFERRED EMBODIMENTS

The present invention permits diffusion bonding composite monolayer sheets of commercially pure as well as alloyed aluminum matrix systems at lower bonding temperatures. Such alloys include 2024 (4.5% Cu, 1.5% Mg, 0.6% Mn); 5052 (2.5% Mg. 0.25% Cr); and 6061 (1.01% Mg, 0.6% Si, 0.25% Cu, 0.25% Cr). The aluminum foil material can be either in the hard (as rolled) or soft (annealed) condition. Furthermore, such diffusion bonding can be accomplished in an atmosphere of air rather than having to resort to vacuum. Low temperature diffusion bonding of such boron-aluminum composites is important in that it reduces the undesirable chemical reaction between the boron fiber and the aluminum matrix. Such fiber matrix reaction results in the embrittlement of the composite system and a reduction of its impact properties. High impact resistance is extremely important in jet engine hardware such as fan and compressor blades.

The surface acid etched pitting of the present invention can also be utilized to improve the bond strength between fiber and matrix when higher strength is dictated by design requirements. In structural components, maximizing the tensile and shear strengths is usually required even if this results in some reduction in impact properties. The etch-pitting process of the present invention permits such results to be obtained at lower bonding temperatures. Although equivalent bond strength levels between fiber and matrix could be produced at higher bonding temperatures, the undesirable effect would be chemical reaction, with the formation of inter-metallic compounds at the fiber-matrix interface, and the attendant reduction in strength and ductility of the material.

The process of the present invention also makes it possible to produce materials of the "tailor made" properties. By a suitable selection of surface preparation and bonding temperatures, a material system can be produced which satisfies the basic requirements of tensile and shear strength as well as impact resistance. Again, low temperature bonding minimizes materials embrittlement by controlling the extent of reaction at the fiber-matrix interface.

In the overall process of the present invention, the first step (after degreasing with an organic solvent, if necessary) is to remove the continuous and tenacious layer of surface oxide and other surface impurities which are on the surface of the aluminum matrix. This step produces an activated surface which is readily attacked in the subsequent etching step by chloride ions.

In the first step, I preferably use a combination of hydrofluoric acid nitric acid, such solution containing from 30 to 33% by weight nitric acid, and from 2 to 3% hydrofluoric acid, with the balance being water. The acid treatment is carried out at room temperature at periods of time ranging from about 2 to 5 minutes. The acid is then removed by rinsing with cold and warm tap water.

The same effect can also be accomplished by using acid etching in a dilute (about 1/2 to 1%) solution of hydrofluoric acid in water under room temperature conditions. The preferred acid cleaning composition contains nitric acid in the solution in order to control the rate of reaction. As a broad proposition, therefore, the initial surface cleaning may be carried out with aqueous solutions containing from about 0.5 to 5% by weight of hydrogen fluoride.

The actual roughening of the aluminum surface takes place in the chemical etch-pitting step. This is accomplished by the preferential etching by chloride ions in the crystallographic planes of the metal. The amount of chloride ion in the aqueous solution should be in the range from about 5 to 10% by weight, calculated as hydrogen chloride. A particularly preferred etchant consists of 5 to 7 weight percent of hydrogen chloride and the balance water. Other chloride solutions, however, such as ferric chloride can be used in acidic solutions.

The etching can be carried out conveniently at room temperature for periods of time ranging from about 6 to 12 minutes. After etching, the surface can be washed clean with cold and warm tap water rinses. Under these conditions, surface pits ranging from about 0.00005 to 0.0004 inch (127 to 1016 microns) are produced and normally such pits measure on the order of 0.0002 inch (508 microns) in depth.

Normally, the pitting operation is followed by a desmutting operation. This consists of immersion of the etch pitted material into a strong solution of nitric acid in water maintained at room temperature. The nitric acid solution is in the range from about 10 to 50% by weight in concentration. During this treatment, surface salts and other impurities are dissolved. The time of immersion is not critical since aluminum is immune to nitric acid, but the normal immersion time is about 2 minutes.

After the pretreatment, the composite materials are ready for diffusion bonding. With the pretreatment of the present invention, pretreated plies of the boron-aluminum composite can be bonded together at times of 5 to 30 minutes, at temperatures of 750° to 950° F (399° to 510° C) and pressures of 8 to 10 ksi (55 to 69 MPa), using either vacuum or air environment.

A variety of test specimens and jet engine components have been successfully diffusion bonded in both vacuum and air environments by using above-described chemical surface roughening techniques. In the case of tensile specimens, a moderate improvement in tensile strength was observed as the result of a stronger matrix-matrix bond. In the case of Charpy specimens, the impact energies obtained were found to be strongly dependent on the relative degree of surface roughening of the aluminum foils used in the fabrication of the monolayer sheets. In general, the fiber-matrix bond increased and the impact energy descreased with increasing levels of surface roughening of the matrix foil. Metallographic and scanning electron micrographic studies of the fractured tensile and Charpy specimens revealed no trace of matrix-matrix bond line or of ply delamination. In both types of environments, vacuum or air, the matrix-to-matrix bond strength levels were equivalent to those obtained when using homogeneous materials.

More specifically, the process of the present invention was used in the fabrication of component monotape sheets and the bonding of such monotapes into test panels as follows. The aluminum alloy foil, after degreasing with methyl-ethyl-ketone was treated with a solution containing from 30 to 33% by weight nitric acid and 2 to 3% hydrofluoric acid, the balance being water. This step removed the aluminum oxide film from the surface of the as-received material and activated the foil surface for the subsequent etch-pitting operation. Surface acid cleaning was carried out at room temperature, at periods of time ranging from 2 to 5 minutes. The acid was then removed by rinsing with cold and warm tap water. The acid cleaned foil was then desmutted to dissolve surface salts and other impurities. To accomplish this, the foil was immersed in a strong solution of nitric acid at room temperature, the nitric acid solution containing between about 10 and 50% by weight nitric acid. The immersion time was about 2 minutes. The time of immersion is not critical, however, since aluminum is immune to nitric acid. After desmutting, the acid was removed by rinsing with cold and warm tap water. The foil was then ready for use in the fabrication of monotape sheets.

Using foils commerically pure and alloyed aluminum, prepared as just described, monotape sheets were fabricated for use as multi-ply tensile shear and Charpy test panels. Depending upon the alloy system, diffusion bonding of monotapes was accomplished in the temperature range from 750° to 950° F (399° to 510° C) at 8 to 10 ksi (55 to 69 MPa) bonding pressure and 5 to 30 minutes bonding time. Surface preparation of these monotapes prior to bonding into high impact resistance panels consisted of the consecutive steps of 1. surface cleaning,
2. acid etch pitting, and
3. desmutting.

The acid composition and cleaning procedures used in step (1) were basically the same as those employed in the preparation of the foils for the fabrication of the monotapes. The monotapes were immersed in the acid mixture for about 2 to 5 minutes, wiped clean and rinsed in tap water.

In the acid etched pitting step, chloride ions were used to cause preferential etching in the crystallographic planes of the metal. The amount of chloride ion in the aqueous solution was in the range from 5 to 10%, calculated as hydrogen chloride. The etching was carried out conveniently at room temperatures for periods of time ranging from about 6 to 12 minutes. After etching, the surface was washed clean with cold and warm tap water rinses. Under these conditions, surface pits ranging from about 0.00005 to 0.0004 inch (127 to 1013 microns) were produced. Normally such pits measure on the order of about 0.0002 inch (508 microns) in depth.

The acid etch pitting operation was followed by a desumutting operation which consisted in immersing the etch pitted material into a strong solution of nitric acid in water maintained at room temperature. As previously noted, the nitric acid concentration may be in the range from about 10 to 50% by weight. During this treatment surface salts and other impurites were dissolved. After desmutting, the monotapes were ready for bonding into multi-ply panels. The monotapes were bonded into test panels both in air and vacuum environments. Depending on the alloy system, such bonding was accomplished in the temperature range of 750° to 950° F (399° to 510° C) at 8 to 10 ksi (55 to 69 MPa) bonding pressure and 5 to 30 minutes bonding time.

The evaluation of the test specimens was carried out by metallography, scanning electron microscope analysis, and mechanical testing. The results can be summarized as follows:

The etch pitting of the monotapes prior to bonding produced matrix-matrix shear strengths approximating that of homogeneous material. The impact strength of composites was significantly higher in test panels produce where the foil treatment consisted of acid surface cleaning and desmutting. This was attributed to a strong matrix-matrix bond and a moderate-to-weak fiber-matrix bond conducive to a controlled degree of fiber pullout. Lower impact properties of composites produced where a chemical etch was used on the foil were found to be the result of a strong fiber-matrix bond which was confirmed by scaning electron microscope analysis of the fractured specimens showing fibers completely coated with aluminum.

Tensile and shear properties were consistently higher in panels fabricated using the acid etch treatment on the foil. Results were attributed to a strong fiber-matrix bond and a low level of fiber pullout.

Jet engine fan blades were fabricated using fully dense monotapes preconditioned as described above. The blades were built up from monotape ply shapes and diffusion bonded in an air atmosphere. Evaluation of the blades by ultrasonic C-scan and optical microscopy revealed sound metallurgical bond at the matrix-matrix interface. In ballistic testing, the blades sustained substantial impact without catastrophic damage or excessive debonding.

The process of the present invention makes it possible to improve the bond between the bond between plies of systems which are considered difficult to bond. Furthermore, as the bonding can be accomplished at relatively low bonding temperatures, the possibility of a deleterious chemical reaction occurring between the boron fibers and the aluminum matrix is reduced. As a further advantage, the process of the present invention makes it possible to secure sound bonding in an air atmosphere instead of having to use a vacuum atmosphere.

It should be understood that various modifications can be made to the described embodiments without departing from the scope of the present invention.

I claim as my invention:

1. The method of diffusion bonding aluminum surfaces which comprises treating oxide-free surface of aluminum with an aqueous solution containing a sufficiently high chloride ion concentration to cause etch-pitting on said surfaces, and then diffusion bonding said surfaces together.

2. The method of claim 1 in which said diffusion bonding is carried out in air.

3. The method of claim 2 in which the diffusion bonding is carried out at temperatures of from 750° to 950° F (399° to 510° C).

4. The method of claim 1 in which said surfaces are freed of oxides prior to contact with said aqueous solution by means of an acid reagent containinng hydrofluoric acid.

5. The method of diffusion bonding together two surfaces of boron reinforced aluminum matrices which comprises cleaning the surfaces with an aqueous solution of hydrofluoric acid to remove surface metal oxides, contacting the thus cleaned surfaces with an aqueous solution having a sufficiently high chloride ion concentration to cause etch pitting on said surfaces, and thereafter diffusion bonding the thus treated surfaces together.

6. The method of claim 5 in which said surface is desmutted with nitric acid after the chloride ion treatment and before the diffusion bonding.

7. The method of claim 5 in which said diffusion bonding is carried out in air at a temperature of 750° to 950° F (399° to 510° C) and at a pressure of from 8 to 10 ksi (55 to 69 MPa).

8. In the method of diffusion bonding together two surfaces of boron fiber reinforced aluminum wherein such surfaces are bonded together under heat and pressure, the improvement which comprises etching the surfaces with a chloride ion bath to cause etch pitting of said surfaces prior to diffusion bonding said surfaces together.

9. The method of claim 8 in which the surfaces are etched to a depth of from 0.00005 to 0.0004 inch (127 to 1016 microns).

10. The method of claim 8 in which said chloride ion bath is a solution of from 5 to 10% by weight of hydrochloric acid.

* * * * *

UNITED STATES PATENT AND TRADEMARK OFFICE
CERTIFICATE OF CORRECTION

PATENT NO. : 4,025,036
DATED : May 24, 1977
INVENTOR(S) : Paul Melnyk

It is certified that error appears in the above-identified patent and that said Letters Patent are hereby corrected as shown below:

Column 6, line 17 change "surface" to --surfaces--.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks